(12) United States Patent
Fujii et al.

(10) Patent No.: US 7,546,913 B2
(45) Date of Patent: Jun. 16, 2009

(54) LOCK-UP CLUTCH MECHANISM

(75) Inventors: Tamotsu Fujii, Fukuroi (JP); Kenji Maruo, Fukuroi (JP); Hideaki Takabayashi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 283 days.

(21) Appl. No.: 11/293,311

(22) Filed: Dec. 5, 2005

(65) Prior Publication Data
US 2006/0118378 A1 Jun. 8, 2006

(30) Foreign Application Priority Data
Dec. 7, 2004 (JP) ............................. 2004-354026

(51) Int. Cl.
*F16H 45/02* (2006.01)
*F16D 13/60* (2006.01)
(52) U.S. Cl. ................... 192/3.28; 192/107 R; 29/592
(58) Field of Classification Search ............... 192/3.28, 192/52.2, 52.3
See application file for complete search history.

(56) References Cited

U.S. PATENT DOCUMENTS

| 1,934,109 | A | * | 11/1933 | Wemp ............... 192/107 C |
| 2,180,086 | A | * | 11/1939 | Kraft ............... 192/107 R |
| 5,065,853 | A | * | 11/1991 | Fujimoto et al. ....... 192/3.29 |
| 6,123,178 | A | * | 9/2000 | Hinkel ............... 192/3.29 |
| 6,336,540 | B1 | * | 1/2002 | Boule et al. ......... 192/107 R |
| 2004/0050646 | A1 | * | 3/2004 | Matthes et al. ....... 192/107 R |
| 2007/0289830 | A1 | * | 12/2007 | Suzuki et al. .......... 192/3.29 |

FOREIGN PATENT DOCUMENTS

JP         2004-011710 A      1/2004

* cited by examiner

*Primary Examiner*—Rodney H Bonck
(74) *Attorney, Agent, or Firm*—Miles & Stockbridge P.C.

(57) ABSTRACT

The present invention provides a lock-up clutch mechanism for a torque converter, comprising a lock-up clutch to which a friction material having a friction surface is secured and a front cover having an engagement surface with which the friction surface is engaged when the friction surface is urged in an axial direction and in which the friction surface of the friction material has a configuration including a protruded area protruding in the axial direction.

18 Claims, 2 Drawing Sheets

LOCK-UP CLUTCH MECHANISM

BACKGROUND OF THE INVENTION

1. Field of the Invention

The present invention relates to a lock-up clutch mechanism used in a torque converter of an automatic transmission for a vehicle and more particularly, it relates to an improvement in a frictional sliding surface of the lock-up clutch mechanism.

2. Related Background Art

A torque converter used in an automatic transmission can provide smooth start, acceleration and deceleration, but has worse transmitting efficiency since it transmits a power via fluid. Thus, there has been proposed a technique in which, if a speed of a vehicle exceeds a predetermined value, a lock-up clutch mechanism is operated to connect to a drive wheel directly in order to reduce energy loss and enhance a fuel consumption rate.

Further, in recent years, in order to further enhance the fuel consumption rate, the lock-up clutch mechanism has been operated even at a low speed operation of the vehicle. In this case, in order to reduce engine vibration and transmission shock, so-called slip lock-up control-in which the lock-up control is performed while maintaining a slip amount at a predetermined number of revolutions is carried out.

In general, the lock-up clutch may cause self-excited vibration called as judder, thereby worsening the comfort of the vehicle considerably. The judder is greatly influenced particularly by unbalance of surface pressure distribution in a circumferential direction at a friction surface during the slipping. The unbalance of the surface pressure distribution is greatly influenced by accuracy of the friction surface, and, for example, dispersion is generated on the friction surface in the circumferential direction by undulation of a piston of the lock-up clutch and/or distortion of a fitting bolt for a drive plate provided in a front cover.

In order to suppress of occurrence of such judder, for example, Japanese Patent Application Laid-open No. 2004-011710 proposes a technique in which a difference in density between a radial inner side and a radial outer side of a friction material secured to a lock-up piston by compressing the friction material or reduction of a μ-V property of the friction surface is suppressed by providing a tapered friction material.

However, since the occurrence of the judder greatly relies upon the unbalance of the surface pressure distribution in the circumferential direction at the friction surface during the slipping, the judder is not necessarily avoided by the technique disclosed in the above-mentioned Japanese Patent Application Laid-open No. 2004-011710.

SUMMARY OF THE INVENTION

Accordingly, an object of the present invention is to provide a lock-up clutch mechanism which can make surface pressure of a friction surface in a circumferential direction uniform with a simple construction, regardless of change in an urging force of a piston of a lock-up clutch, thereby preventing occurrence of judder.

To achieve the above object, the present invention provides a lock-up clutch mechanism for a torque converter, comprising a lock-up clutch to which a friction material having a friction surface is secured and a front cover-having an engagement surface with which the friction surface is engaged when the friction surface is urged in an axial direction and in which the friction surface of the friction material has a configuration including a protruded area protruding in the axial direction.

To achieve the above object, the present invention provides a method for manufacturing a lock-up clutch mechanism for a torque converter, the lock-up clutch mechanism comprising a lock-up clutch to which a friction material having a friction surface is secured and a front cover having an engagement surface with which the friction surface is engaged when the friction surface is urged in an axial direction and in which the friction surface of the friction material has a curved configuration including a protruded area protruding in the axial direction and the curved configuration is formed by a molding process when the friction material is secured to the lock-up clutch.

To achieve the above object, the present invention further provides a method for manufacturing a lock-up clutch mechanism for a torque converter, the lock-up clutch mechanism comprising a lock-up clutch to which a friction material having a friction surface is secured and a front cover having an engagement surface with which the friction surface is engaged when the friction surface is urged in an axial direction and in which the friction material has a substantially uniform axial thickness and a curved configuration including a protruded area protruding in the axial direction, and a protruded area protruding in the axial direction is provided at a position of the lock-up clutch to which the friction material is secured and the curved configuration is formed on the friction surface.

By providing the protruded area protruding in the axial direction on the friction surface, even when a piston of the lock-up clutch is urging with a relatively small urging force during lock-up slip, since contact surface pressure at an apex of the protruded area is high and the friction material can be contacted with the front cover substantially uniformly in a circumferential direction due to flexibility of the friction material, the uniformity of the friction surface pressure in the circumferential direction is improved.

Further, even if the urging force of the piston is changed, the uniformity of the friction surface pressure in the circumferential direction is maintained more stably, thereby reducing the judder.

DESCRIPTION OF THE PREFERRED EMBODIMENTS

Figure 1:
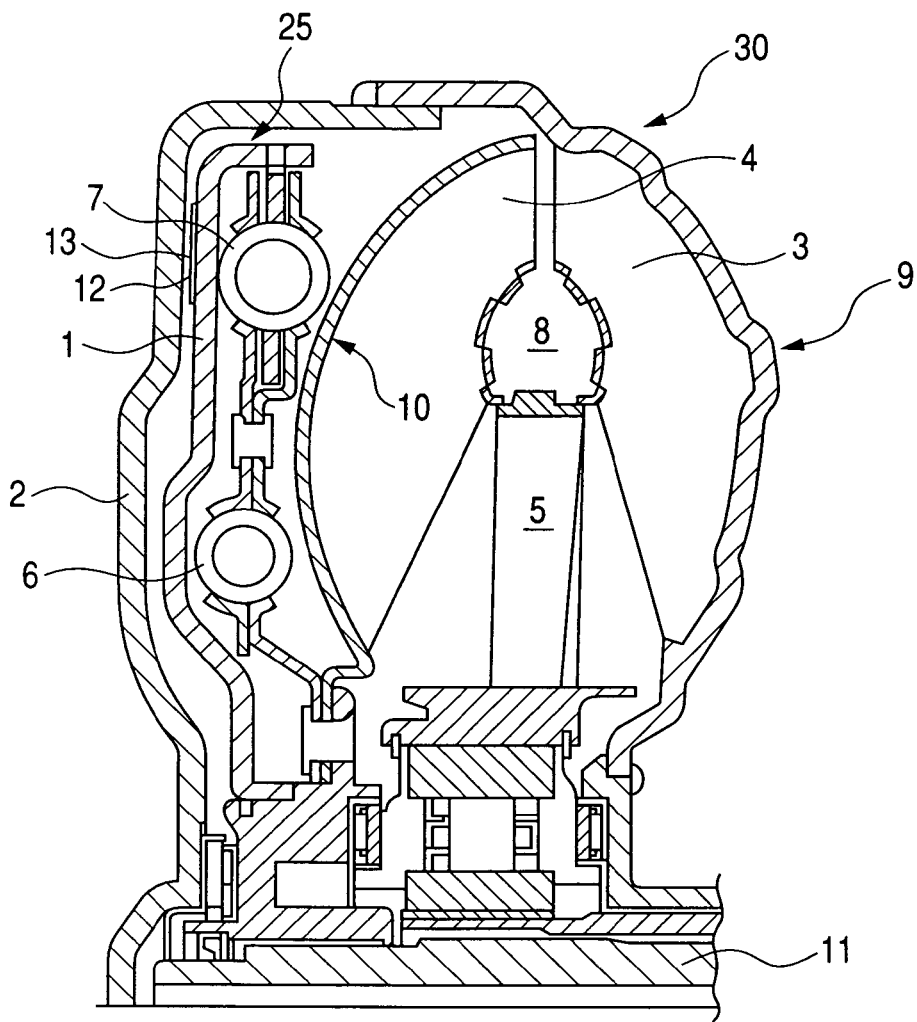
FIG. 1 is an axial partial sectional view of a torque converter with a lock-up clutch mechanism to which embodiments of the present invention can be applied.

Now, embodiments of the present invention will be fully explained with reference to the accompanying drawings. In the drawings, the same parts or elements are designated by the same reference numerals. Further, it should be noted that the embodiments which will be described later merely exemplify the present invention and do not intend to limit the present invention at all.

FIG. 1 is an axial partial sectional view of a torque converter 30 with a lock-up clutch mechanism to which the embodiments of the present invention can be applied, showing a released condition of a lock-up clutch. The torque converter 30 comprises a front cover 2 which constitutes a part of a housing of the torque converter 30, an impeller 9 as a donut-shaped impeller secured to the front cover 2, a turbine 10 as a donut-shaped impeller having blades opposed to blades of the impeller 9, and a stator 5 rotatably disposed between the impeller 9 and the turbine 10. A torque converter body is constituted by the impeller 9, turbine 10 and stator 5.

The impeller 9 is connected to a crankshaft of an engine (not shown) of a vehicle and is rotated together with the front cover 2 in synchronous with rotation of the engine. Further, the turbine 10 is directly connected to an output shaft 11 and is connected to wheels (not shown) via a transmission mechanism (not shown). The stator 5 is sandwiched centrally between the impeller 9 and the turbine 10 and serves to change a flow of fluid filled within the torque converter 30.

Between an inner surface of the front cover 2 and an outer surface of the turbine 10, there is provided a lock-up clutch as an annular plate having a piston function, i.e. a lock-up piston 1, which forms a part of the lock-up clutch mechanism and which is rotated integrally with the output shaft 11, and a friction material 12 is fixed and secured to a surface of the lock-up piston which is opposed to the inner surface of the front cover 2. A friction surface 13 of the friction material 12 is opposed to the inner surface of the front cover 2. Incidentally, for simplicity's sake,. "lock-up piston" will be referred merely to as "piston" hereinafter.

A damper mechanism comprising coil springs 6 and 7 is disposed between the outer surface of the turbine 10 and the piston 1 in order to dampen shock when the piston 1 is engaged. Further, a central space 8 is defined at a central portion of the torque converter 30.

Next, an operation of the piston 1 will be described. If a speed of a vehicle exceeds a predetermined value, feedback control is initiated by a control mechanism (not shown) so that the flow of the fluid within the torque converter 30 defined by the impeller 9 and the turbine 10 is automatically changed. By such change, the piston 1 is urged against the inner surface of the front cover 2 to firmly engage the friction material 12 of the piston 1 with the inner surface of the front cover 2, thereby establishing a direct connection condition of the piston 1, with the result that a driving force of the engine is directly transmitted to the output shaft 11. Accordingly, since drive and output sides are mechanically locked up (directly connected) without interposition of the fluid, fluid loss can be prevented and a fuel consumption rate can be enhanced.

Incidentally, the torque converter 30 is connected to an oil pressure control mechanism (not shown), and the oil pressure control mechanism serves to change (increase or decrease) a flow rate of oil while maintaining a substantially constant pressure difference (pressure difference across the piston 1) between two oil paths on both sides of the piston 1, i.e. between outer peripheral side and an inner peripheral side of the piston, in order to maintain a slip condition of the lock-up piston, i.e. piston 1.

First Embodiment

Figure 2:
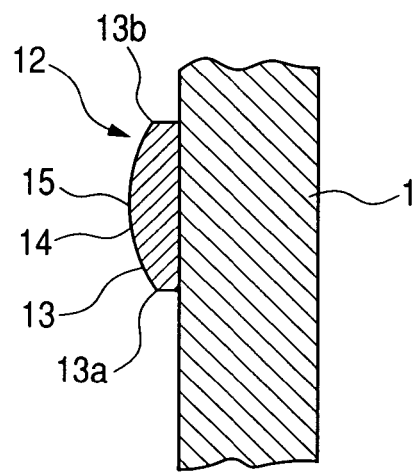
FIG. 2 is an enlarged partial sectional view showing a lock-up piston and a friction material, according to a first embodiment of the present invention.

FIG. 2 is an enlarged partial sectional view showing a piston and a friction material according to a first embodiment of the present invention. The friction material 12 has a protruded area 14 protruding axially from the friction surface 13. In this embodiment, the protruded area 14 is formed as a curved surface between a radial inner end 13a and a radial outer end 13b of the friction surface 13, and an axial thickness of the friction material 12 becomes maximum at an apex 15 positioned in a substantially central position of the friction material.

The protruded area 14 is provided through a whole circumferential periphery of the substantially annular friction material 12. A curved surface configuration of the friction surface 13 is formed by a molding process when the friction material 12 is secured to the piston 1. That is to say, an additional process for forming the curved surface configuration is not required.

In order to manufacture a lock-up clutch mechanism according to the illustrated embodiment, first of all, the piston 1 is prepared, and then, the friction material 12 is secured to the piston 1. Substantially simultaneously with the securing, the friction material 12 is molded, thereby forming the friction surface 13 including the curved surface.

Second Embodiment

Figure 3:
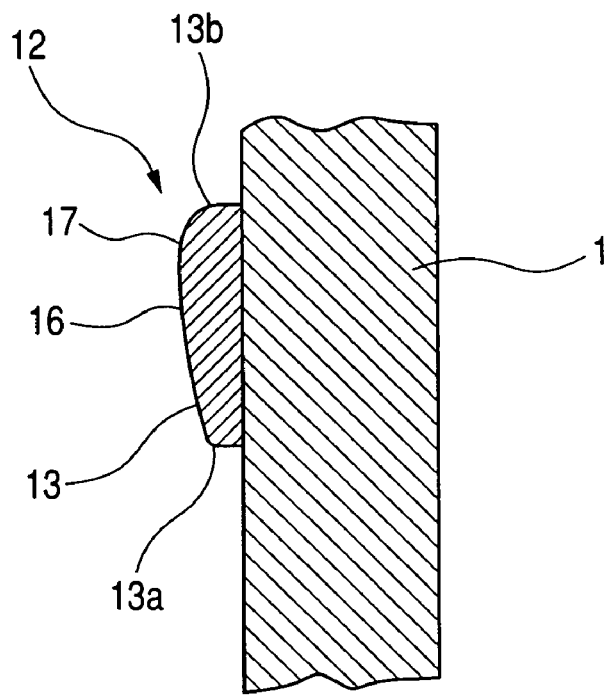
FIG. 3 is an enlarged partial sectional view showing a lock-up piston and a friction material, according to a second embodiment of the present invention.

FIG. 3 is an enlarged partial sectional view showing a piston and a friction material according to a second embodiment of the present invention. The friction material 12 has a protruded area 16 protruding axially from the friction surface 13. Also in this embodiment, the protruded area 16 is formed as a curved surface between a radial inner end 13a and a radial outer end 13b of the friction surface 13. An axial thickness of the friction material 12 becomes greatest at an apex 17 of the protruded area 17. In the illustrated embodiment, the apex 17 is positioned nearer the outer end 13b of the friction material than the inner end 13a, and a region between the apex 17 and the inner end 13a is formed as a curved surface gently inclined.

Similar to the first embodiment, the protruded area 16 is provided through a whole circumferential periphery of the substantially annular friction material 12. Further, a curved surface configuration of the friction surface 13 is formed by a molding process when the friction material 12 is secured to the piston 1. That is to say, an additional process for forming the curved surface configuration is not required.

In order to manufacture a lock-up clutch mechanism according to the illustrated embodiment, first of all, the piston 1 is prepared, and then, the friction material 12 is secured to the piston 1. Substantially simultaneously with the securing, the friction material 12 is molded, thereby forming the friction surface 13 including the curved surface.

Third Embodiment

Figure 4:
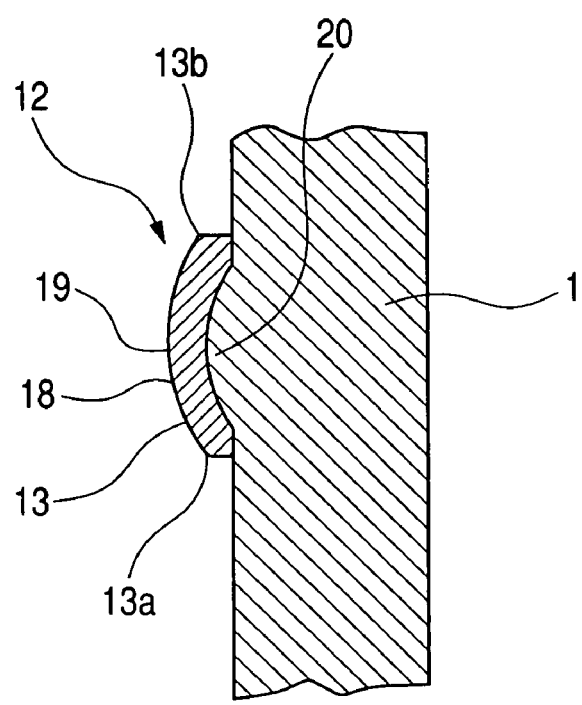
FIG. 4 is an enlarged partial sectional view showing a lock-up piston and a friction material, according to a third embodiment of the present invention.

FIG. 4 is an enlarged partial sectional view showing a piston and a friction material according to a third embodiment of the present invention. The friction material 12 has a protruded area 18 protruding axially from the friction surface 13. In this embodiment, the protruded area 18 is formed as a curved surface between a radial inner end 13a and a radial outer end 13b of the friction surface 13, and an axial protruded amount of the friction material becomes maximum at an apex 19 positioned in a substantially central position of the friction material.

Similar to the first and second embodiments, the protruded area 18 is provided through a whole circumferential periphery of the substantially annular friction material 12. However, in the third embodiment, different from the first and second embodiments, as apparent from FIG. 4, the friction material 12 is curved but has a substantially uniform thickness.

In this embodiment, a part-of the piston 1 to which the friction material 12 is secured has an annular ridge portion 20 ridged as a curved surface. Since the friction material 12 having the substantially uniform thickness is secured to the ridge portion 20, after the securing, a protruded portion 18 having a curved surface complementary to the curved surface of the ridge portion 20 is formed in the friction material 12. Further, since a curved surface of the friction surface 13 is formed at the same time when the friction material 12 is secured to the piston 1, an additional process for forming the curved surface configuration is not required.

In order to manufacture a lock-up clutch mechanism according to the illustrated embodiment, first of all, the piston 1 having the ridge portion 20 is prepared, and then, the friction material 12 is secured to the piston 1. When the friction material 12 is secured, the friction surface 13 including the curved surface is formed substantially automatically. In FIG. 4, although the ridge portion 20 is added to the piston 1, the ridge portion 20 may be provided by press-working the piston itself.

In the embodiments as mentioned above, although the friction material 12 has the substantially annular shape, the friction material is not necessarily annular, and, for example, the friction material may be formed by arranging a plurality of friction material segments in an annular pattern. Further, although the friction surface 13 of the friction material 12 is formed as the curved surface, the friction surface may include a partially flat surface. Further, the friction material 12 may have a varying thickness in a radial direction.

What is claimed is:

1. A lock-up clutch mechanism for a torque converter, comprising:
    a lock-up clutch including a substantially annular friction material having a friction surface; and
    a front cover having an engagement surface, said friction surface and said engagement surface being axially opposed such that said friction surface frictionally engages with said engagement surface when said friction material is urged in an axial direction,
    wherein said friction surface is curved convexly toward said engagement surface throughout substantially an entire circumference of the friction material, and
    when said friction material is urged toward said engagement surface with a relatively small urging force during lock-up slip, an apex portion of the curved friction surface is contacted with said engagement surface with a sufficiently high surface pressure so that the surface pressure along a circumferential direction of the curved friction surface is substantially uniform.

2. A lock-up clutch mechanism according to claim 1, wherein said friction surface is curved such that a radially outer portion of said friction surface protrudes toward said engagement surface.

3. A lock-up clutch mechanism according to claim 1, wherein said friction surface is curved such that a substantially radially central portion of said friction surface protrudes toward said engagement surface.

4. A lock-up clutch mechanism according to claim 1, wherein said friction material has a varying thickness in a radial direction.

5. A lock-up clutch mechanism according to claim 1, wherein said friction material has a uniform thickness in a radial direction and is supported on a curved surface of the lock-up clutch.

6. A lock-up clutch mechanism according to claim 1, wherein the friction surface follows a continuous curved profile from an inner radial edge of the friction material to an outer radial edge of the friction material.

7. A method for manufacturing a lock-up clutch mechanism for a torque converter, comprising the steps of:
    providing a lock-up clutch;
    securing to the lock-up clutch a substantially annular friction material having a friction surface;
    simultaneously with the securing, molding said friction material such that said friction surface is curved convexly throughout substantially an entire circumference of said friction material; and
    providing a front cover having an engagement surface such that said friction surface and said engagement surface are axially opposed,
    wherein said friction surface is curved convexly toward said engagement surface so as to frictionally engage with said engagement surface when said friction material is urged in an axial direction,
    and when said friction material is urged toward said engagement surface with a relatively small urging force during lock-up slip, an apex portion of the curved friction surface is contacted with said engagement surface with a sufficiently high surface pressure so that the surface pressure along a circumferential direction of the curved friction surface is substantially uniform.

8. A method for manufacturing a lock-up clutch mechanism according to claim 7, wherein said friction surface of the molded friction material is curved such that a radially outer portion of said friction surface protrudes toward said engagement surface.

9. A method for manufacturing a lock-up clutch mechanism according to claim 7, wherein said friction surface of the molded friction material is curved such that a substantially radially central portion of said friction surface protrudes toward said engagement surface.

10. A method for manufacturing a lock-up clutch mechanism according to claim 7, wherein the friction surface of the molded friction material follows a continuous curved profile from an inner radial edge of the friction material to an outer radial edge of the friction material.

11. A method for manufacturing a lock-up clutch mechanism according to claim 7, wherein the molded friction material has a varying thickness in a radial direction.

12. A method for manufacturing a lock-up clutch mechanism according to claim 7, wherein the molded friction material has a uniform thickness in a radial direction and is secured on a curved surface of the lock-up clutch.

13. A method for manufacturing a lock-up clutch mechanism for a torque converter, comprising the steps of:
    providing a lock-up clutch having a curved surface;
    securing to the lock-up clutch at the curved surface a substantially annular friction material having a friction surface such that the friction surface is curved convexly throughout substantially an entire circumference of said friction material; and
    providing a front cover having an engagement surface such that said friction surface and said engagement surface are axially opposed,
    wherein said friction surface is curved convexly toward said engagement surface so as to frictionally engage with said engagement surface when said friction material is urged in an axial direction,
    and when said friction material is urged toward said engagement surface with a relatively small urging force during lock-up slip, an apex portion of the curved friction surface is contacted with said engagement surface with a sufficiently high surface pressure so that the surface pressure along a circumferential direction of the curved friction surface is substantially uniform.

14. A method for manufacturing a lock-up clutch mechanism according to claim 13, wherein said friction surface is curved such that a radially outer portion of said friction surface protrudes toward said engagement surface.

15. A method for manufacturing a lock-up clutch mechanism according to claim 13, wherein said friction surface is curved such that a substantially radially central portion of said friction surface protrudes toward said engagement surface.

16. A method for manufacturing a lock-up clutch mechanism according to claim 13, wherein the friction surface follows a continuous curved profile from an inner radial edge of the friction material to an outer radial edge of the friction material.

17. A method for manufacturing a lock-up clutch mechanism according to claim 13, wherein said friction material has a varying thickness in a radial direction.

18. A method for manufacturing a lock-up clutch mechanism according to claim 13, wherein said friction material has a uniform thickness in a radial direction.

* * * * *